UNITED STATES PATENT OFFICE.

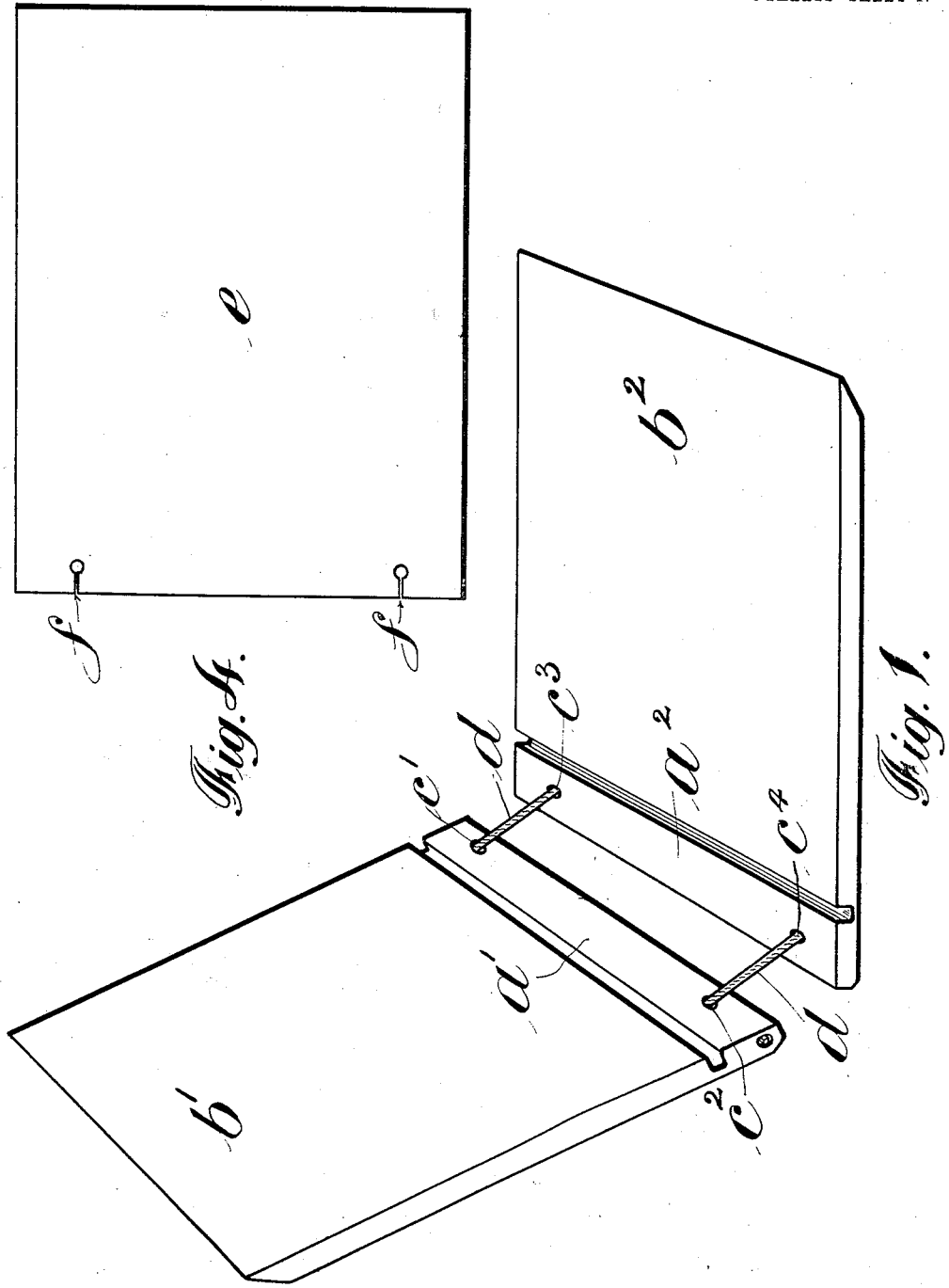

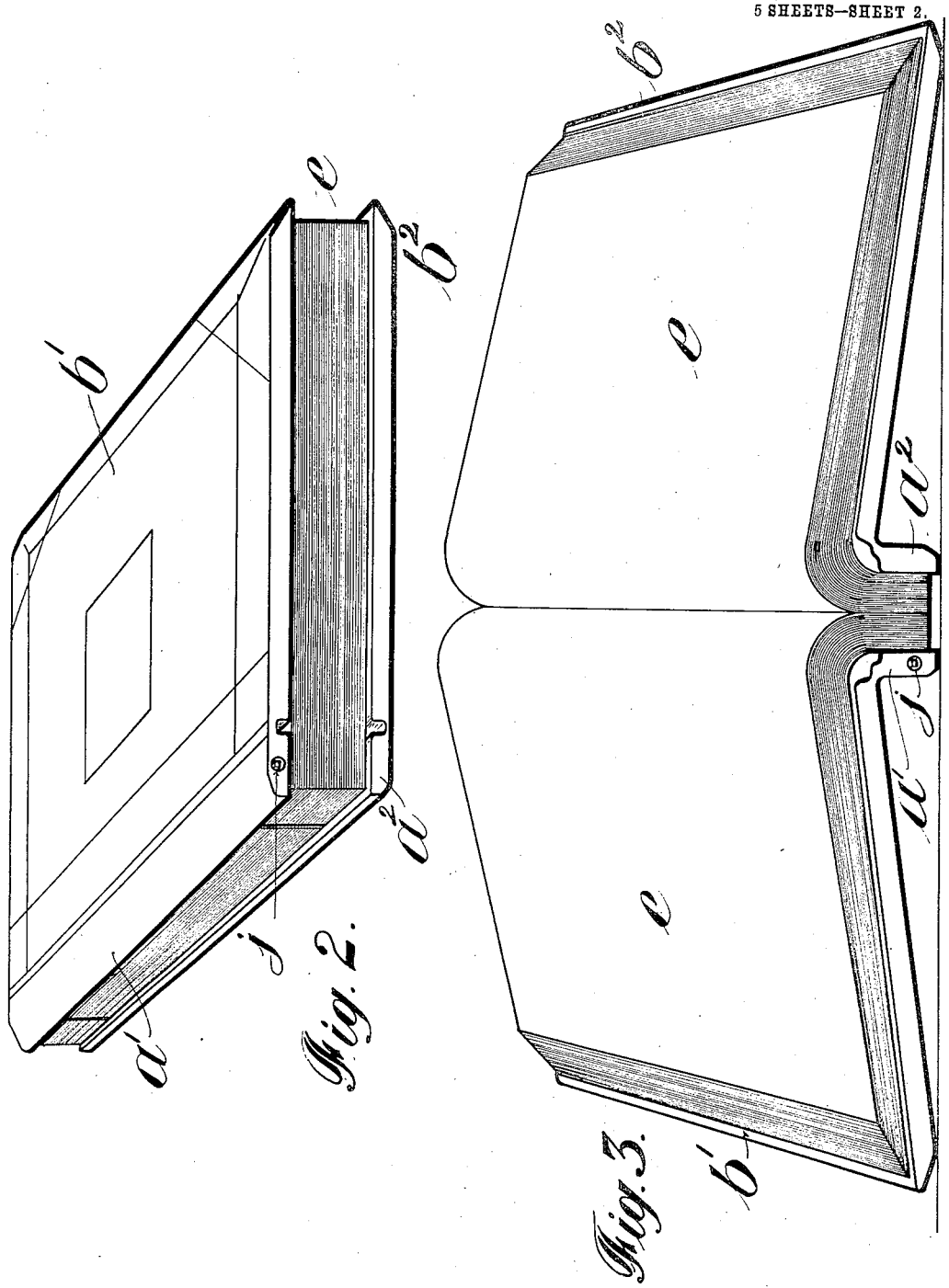

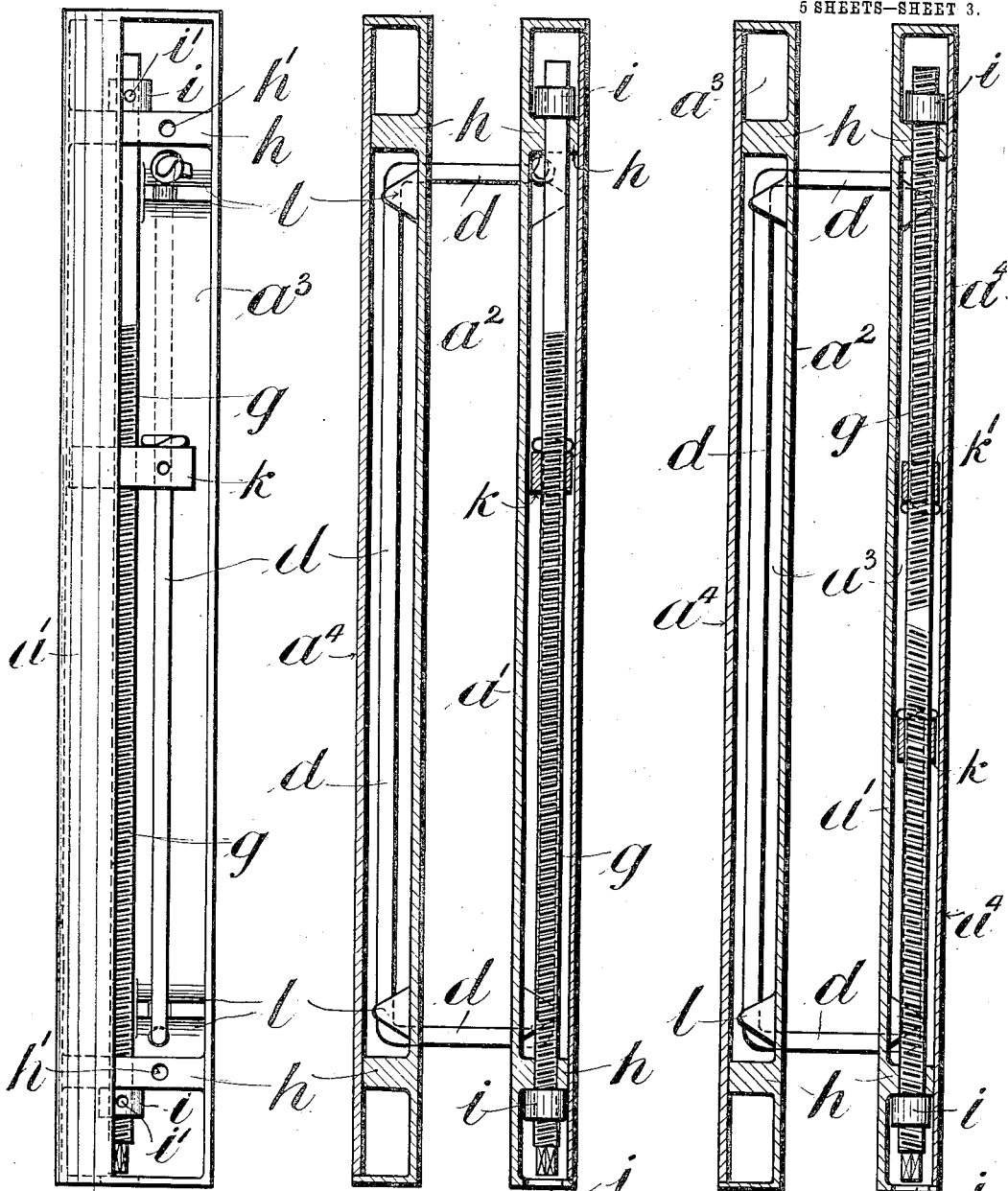

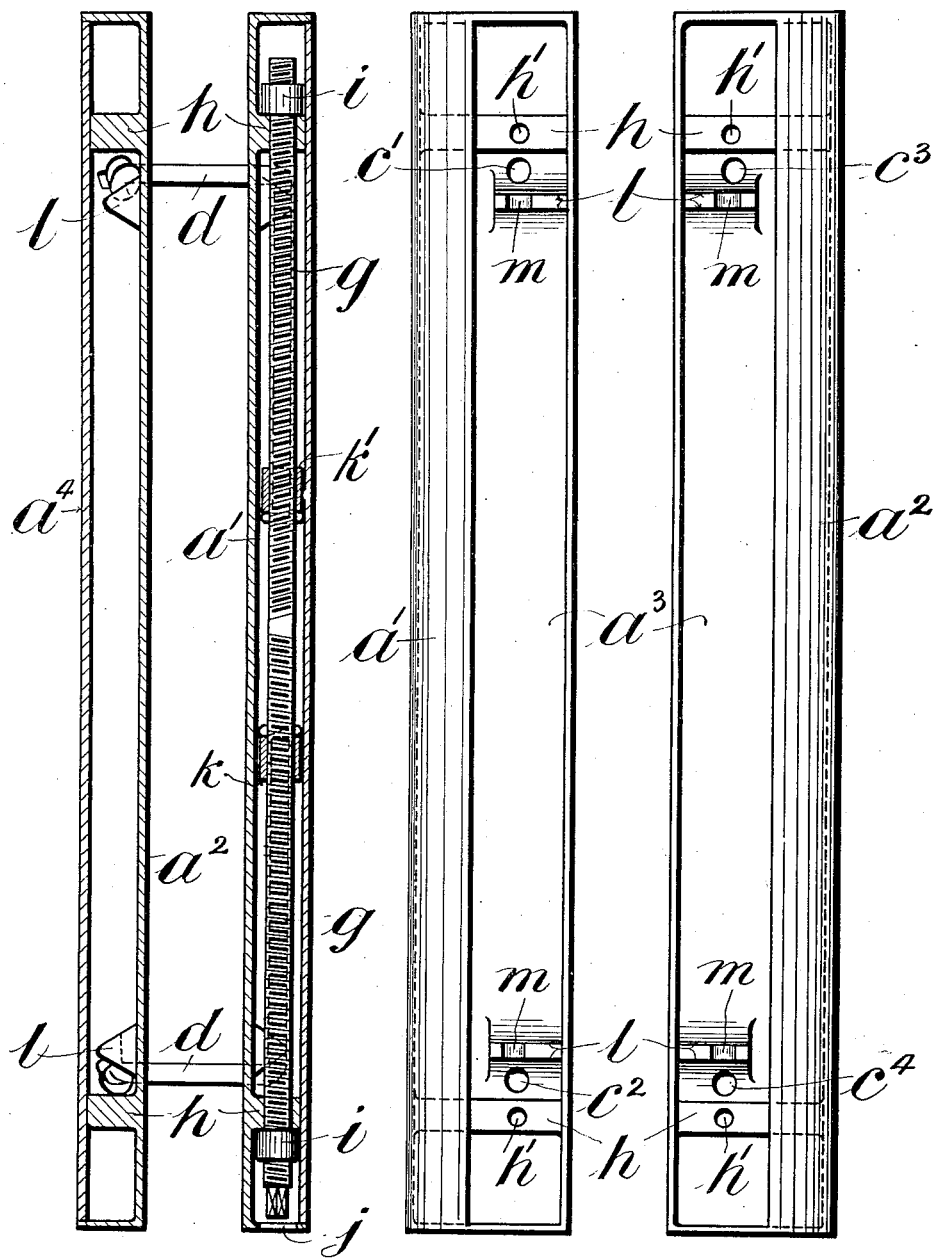

RICHARD HENRY BARLOW AND PERCY BARTON, OF BURY, NEAR MANCHESTER, ENGLAND.

LOOSE-LEAF BINDER.

956,509.  Specification of Letters Patent.  Patented May 3, 1910.

Application filed February 18, 1908. Serial No. 416,517.

*To all whom it may concern:*

Be it known that we, RICHARD HENRY BARLOW and PERCY BARTON, both subjects of the King of Great Britain and Ireland, and residents of Bury, near Manchester, England, have invented certain new and useful Improvements in Loose-Leaf Binders, of which the following is a specification.

This invention relates to and consists of an improved construction of binder for enabling loose sheets or leaves to be temporarily bound and used as a book, or for binding loose sheets or leaves after they have been used in book form and which require to be kept for reference.

The uses of the invention will be chiefly as a perpetual ledger and as a transfer binder.

According to the invention, the improved binder consists of two half book backs or covers, each made solid and resembling the backs of an ordinary book. It also consists of two hollow bars (hereinafter called clamps), to one longitudinal edge of each of which is hinged or flexibly connected one of the said half covers.

Passing from one clamp to the other is a cord, wire or other suitable flexible connecting means, and by means of adjusting mechanism within one or the other (or both) of the clamps, the clamps may be drawn together and caused to firmly hold leaves placed between them, or may be caused to separate and allow the leaves to be withdrawn.

Figures 14, 15:
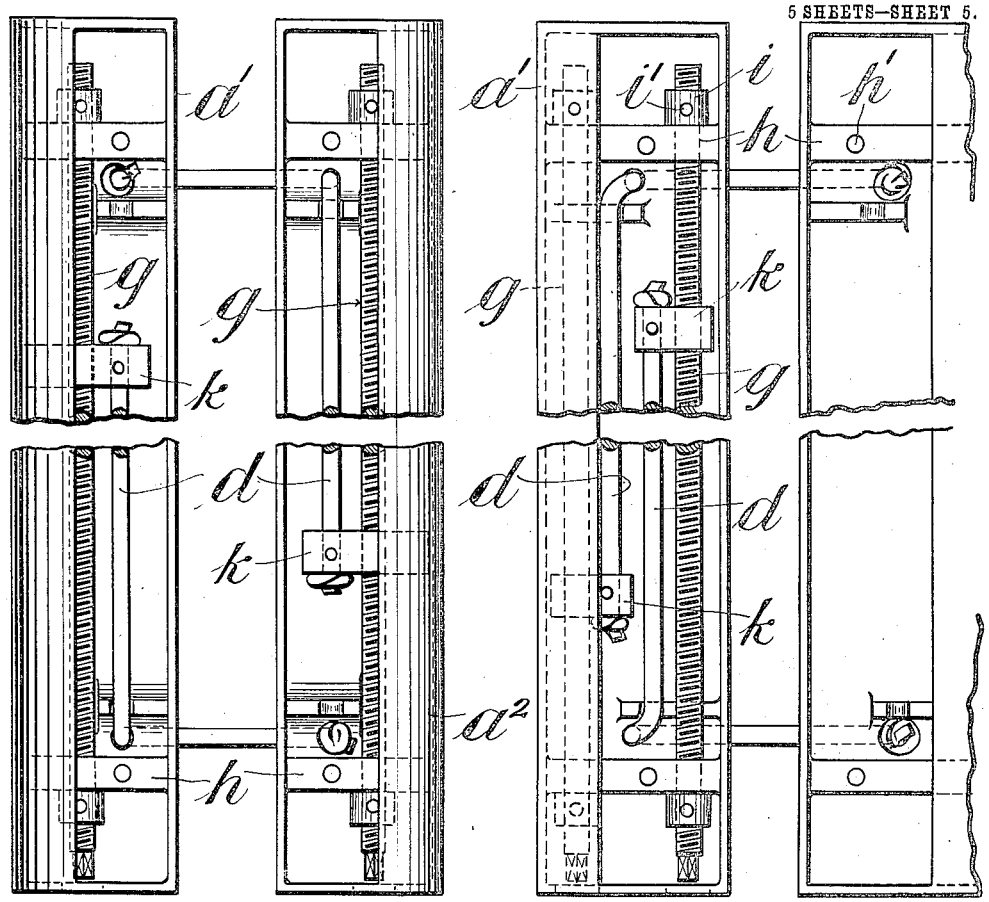
Figure 13:
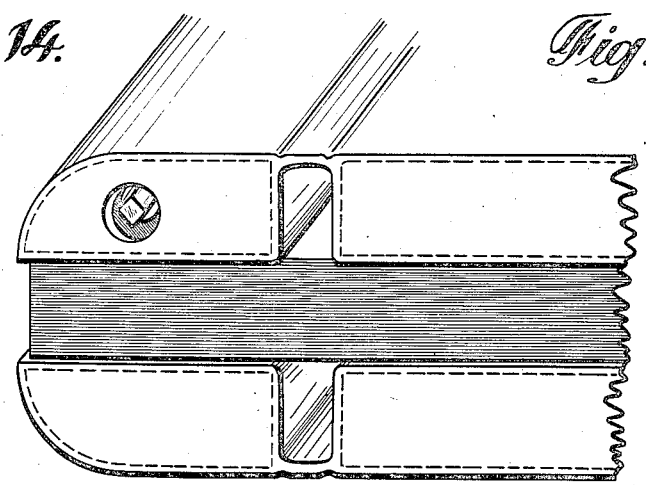

Upon the accompanying drawing, Figure 1 illustrates a general perspective view of the improved loose leaf binder as it appears prior to being used. Figs. 2 and 3 illustrate a like view of the binder fitted with leaves and used as a ledger, the ledger being shown closed in Fig. 2 and open in Fig. 3. Fig. 4 illustrates one of the leaves used in the binder. Fig. 5 illustrates to a larger scale an outside face view with closing plate removed, of one of the clamps separate from the cover part of the binder. Fig. 6 illustrates longitudinal sections of the two clamps side by side, these views showing more particularly the manner in which the cord passes from one clamp to the other. Figs. 7 and 8 illustrate cross sections of the clamps. Figs. 9 and 10 illustrate like views to Fig. 6 of modifications. Fig. 11 illustrates the shell only of the clamp shown in Fig. 5, and Fig. 12 illustrates the shell of the left-hand clamp shown in Fig. 6. Fig. 13 illustrates a perspective view of the lower ends of the clamps and shows more clearly the manner in which the half covers are hinged to the clamps. Figs. 14 and 15 illustrate further modifications hereinafter described.

In all the views (where shown) $a^1$, $a^2$ are the two clamps and $b^1$, $b^2$ the half covers of the binder, the covers being hinged or flexibly connected along one edge to the clamps as shown. That is to say, the leather or other material used for facing the edges of the covers extends to and is also used for facing the clamps, the part which bridges over the intervening space forming the necessary flexible connection, see Fig. 15.

$c^1$, $c^2$ are holes formed about an inch from each end in the clamps $a^1$, and $c^3$, $c^4$ are holes formed about an inch from each end in the clamp $a^2$.

$d$ is the cord, preferably made of leather cut from the butt, which passes through the said holes and serves, when adjusted, for drawing the clamps toward each other.

$e, e$ are the loose leaves used with the binder, one of them being shown separately in Fig. 4, and in one end or edge of each of which are formed the key-hole shaped or like slots $f, f$, whereby the leaf, when placed between the covers of the binder, may be readily caused to engage those portions of the cord passing between the clamps. Each clamp, which is preferably made of aluminium, is in the form of a flattened casing or shell with one of its wider sides flat and the other partly rounded, see Figs. 7 and 8. In each clasp is a longitudinal opening such as $a^3$, and such opening is covered or opened by a removable plate or cover $a^4$.

In the clamp $a^1$ is a screwed spindle $g$, which is mounted in fixed cross-bridges $h$, $h$, and held at each end against endwise movement by collars $i$, $i$ and cross pins $i^1$. At one end the clamp $a^1$ is formed with a small hole $j$, and such hole comes directly opposite one end of the screwed spindle $g$, which at such end is formed square, as shown in Fig. 5, to allow of a turn-key being applied. Upon the screwed part of the spindle is the nut $k$, preferably of rectangular and elongated formation, and such nut, when the spindle is rotated, is adapted to move longitudinally within the interior of the clamp according to the direction of rotation.

In the clamp $a^2$, see Figs. 6 and 7, are two ridges $l$, $l$, each of V formation, and each having a transverse groove $m$ in its edge. Such ridges each lie near to one of the holes $c^3$, $c^4$.

The cord $d$ at one end, after passing through the hole $c^1$ in the clamp $a^1$ is knotted or otherwise held against withdrawal. The other end of the cord is then passed through the hole $c^3$ in the clamp $a^2$, over the ridges $l$, $l$ out through the hole $c^4$ and back through hole $c^2$ into the clamp $a^1$ again. The end of the cord thus threaded through the holes is then passed through a hole in the nut $k$ and knotted on the far or upper side. The length of the cord is preferably such that when the nut $k$ is near that end of the clamp nearest the hole $c^1$, and the clamps lie with their inner side face to face, the cord is taut.

It will now be seen that by rotating the spindle $g$ in one direction, the clamps will be made free to be separated the required distance for admitting between them the leaves to be bound, see Fig. 1. The user may then thread the leaves $e$, $e$ by the slots $f$, $f$ on to those portions of the cord $d$ extending from clamp to clamp, and, when all the leaves are in position, may then rotate the spindle $g$ and, by tightening the cord $d$, draw the clamps together and cause them to firmly clamp and hold the leaves between them, as shown in Figs. 2 and 3.

To remove the leaves, or any one or more of them, the cord is slackened and the clamps separated, the leaves being then free to be withdrawn. The clamps and covers are made to a thickness, and the connection is such, that, when the book is closed, the covers lie flat against the leaves, see Figs. 2 and 13.

As will be seen by a reference to Figs. 2 and 3, the covers $b^1$, $b^2$, by being flexibly connected to the clamps, $a^1$, $a^2$, and the connections being next the outer faces of the clamps, are capable of being turned completely back on the clamps. Furthermore, the flexible connections allow of the book being opened out flat at any page, the inner opposite faces of the clamps (see Fig. 3) when the book is opened lying at right angles to the surface on which the book rests, and the edges of the clamps, especially when lying a considerable distance apart as in the case of a binder holding a large number of leaves, affording a firm support and a resistance to movement to one side or the other. For convenience in ruling and using the book, such features offer a great advantage over known forms of loose leaf binders.

In Fig. 9 we show how, instead of knotting or securing one end of the cord $d$ within the clamp $a^1$, such end may be secured to a further nut $k^1$ on the spindle $g$, this latter in such case being formed with right and left hand screw threads as shown, so that, on rotating the spindle in one direction, the nuts will separate and thus slacken the cord, while on rotating the spindle in the opposite direction the nuts will approach each other and thus tighten the cord.

In Fig. 10 we show how, in connection with the arrangement shown in Fig. 9, there may be two cords $d$, $d$, one of which engages the nut $k$ and the other of which engages the nut $k^1$ in clamp $a^1$ and both of which terminate in a knot in clamp $a^2$.

As a further modification, and for use in binders requiring to hold a large number of leaves, there may be a screwed spindle and nut in both clamps, see Fig. 14. Or there may be two screwed spindles and two nuts in one clamp, see Fig. 15, the nuts being adapted to move past each other from end to end of the clamp.

The ridges $l$, $l$ in Fig. 10 are not necessary in clamp $a^1$ but in order that one pattern may serve in the making of both clamps, it is preferred to leave them in. When the cord passes over them, the ridges serve to prevent the too sharp bending of the cord, both being placed at such points relatively to the holes and being so shaped as to afford a gradual curving of the cord, and therefore an easy action of the cord in passing in and out of the clamp. The cross-bridges $h$, $h$, which act as bearings for the spindle $g$, also serve to stiffen the clamps. They also serve to receive the screws by which the cover plate is secured, each being drilled and tapped with holes $h^1$. Obviously the squared end of the spindle and the hole $j$ may be at the upper end of the binder.

Suitable provision may be made for inclosing the edges of the leaves between the clamps, say by means of overlapping or telescopical flaps applied to the clamps, but to afford the advantage of firmly supporting the book when open, and also to cheapen the cost of producing the binder, we prefer the leaves to be exposed.

What we claim is:—

1. A loose leaf binder comprising two hollow bars each of flattened cross section and each having a hole in one of its wider faces near each end and each bar also having V shaped and notched ridges within it arranged near the said holes and serving as guides, in combination with two half covers and means for flexibly hinging such covers to the bars, a flexible cord passing through the holes in the faces of the bars and means within the bars whereby the cord is caused to draw the bars together or allow them to separate, substantially as herein set forth.

2. In a loose leaf binder, a hollow clamping bar having holes in one of its faces, and a hole in one end, two screw-threaded spindles rotatably mounted in the bar, a nut on each spindle, and flexible clamping means connected to the nuts and passing out through the said holes, in combination with a further clamping bar, also having holes in one of its faces, and through which the said clamping means pass and within which further bar, the clamping means at their opposite ends are secured, substantially as herein set forth.

3. In a loose leaf binder, a hollow clamping bar of flattened cross section having a large aperture in one of its wider faces and a plate for closing the same and also having holes in its other wider face, one near each end, and also having a hole in one end and V-shaped ridges with notches upon its interior, substantially as herein set forth.

In witness whereof we have hereunto set our hands in the presence of two witnesses.

RICHARD HENRY BARLOW.
PERCY BARTON.

Witnesses:
P. D. BAILEY,
F. J. MEREDITH.